(12) United States Patent
Dettinger et al.

(10) Patent No.: US 7,096,217 B2
(45) Date of Patent: Aug. 22, 2006

(54) GLOBAL QUERY CORRELATION ATTRIBUTES

(75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 10/285,228

(22) Filed: Oct. 31, 2002

(65) Prior Publication Data

US 2004/0088292 A1 May 6, 2004

(51) Int. Cl.
*G06F 17/30* (2006.01)

(52) U.S. Cl. .................. 707/4; 707/102; 707/104.1; 707/3

(58) Field of Classification Search .............. 707/1–10, 707/100–104.1, 200
See application file for complete search history.

(56) References Cited

U.S. PATENT DOCUMENTS

| | | | | |
|---|---|---|---|---|
| 5,459,859 A | * | 10/1995 | Senda | 707/10 |
| 5,721,903 A | * | 2/1998 | Anand et al. | 707/5 |
| 6,014,656 A | * | 1/2000 | Hallmark et al. | 707/3 |
| 6,222,540 B1 | * | 4/2001 | Sacerdoti | 345/581 |
| 6,272,488 B1 | * | 8/2001 | Chang et al. | 707/4 |
| 6,289,334 B1 | * | 9/2001 | Reiner et al. | 707/3 |
| 6,353,826 B1 | * | 3/2002 | Seputis | 707/5 |
| 6,370,547 B1 | * | 4/2002 | Eftink | 707/10 |
| 6,397,223 B1 | * | 5/2002 | Kori | 707/3 |
| 6,449,620 B1 | * | 9/2002 | Draper et al. | 707/102 |
| 6,581,055 B1 | * | 6/2003 | Ziauddin et al. | 707/3 |
| 6,611,843 B1 | * | 8/2003 | Jacobs | 707/102 |

* cited by examiner

*Primary Examiner*—Jean M. Corrielus
*Assistant Examiner*—Anh Ly
(74) *Attorney, Agent, or Firm*—Moser, Patterson & Sheridan, LLP

(57) ABSTRACT

A system, method and article of manufacture for accessing data are disclosed. In general, data access is facilitated by a query configured with a correlation criterion or criteria. The presence of the correlation criteria facilitates the introduction of additional correlation logic to be applied to conditions of the query. In general, correlation criteria are contemplated which support correlation of entities based on time, physical location and age, for example.

22 Claims, 8 Drawing Sheets

DATA REPOSITORY ABSTRACTION

$208_1$ { Category name="Demographic" —— $216_1$
Field name="First Name" —— $210_1$
Acess Method="Simple" —— $212_1$
Table="patient" Column="f_name"

$208_2$ { Field name="Last Name" —— $210_2$
Acess Method="Simple" —— $212_2$
Table="patient" Column="l_name"

Category name="Diagnostics" —— $216_2$ $208_3$ { Field name="Diagnosis" —— $210_3$
Acess Method="Simple" —— $212_3$
Table="patient" Column="diag"
Correlation="Age" —— $218_1$
FieldRef="AgeAtDiagnosis"
Correlation="Time" —— $218_2$
FieldRef="Diagnosis Date"

$208_4$ { Field name="Diagnosis Date" —— $210_4$
Access Method="Simple" —— $212_4$
Table="patient" Column="diagdate"

$208_5$ { Field name="AgeAtDiagnosis" —— $210_5$
Access Method="Composed" —— $212_5$
Composition=Field(Diagnosis Date)-Field(Birth Date) —— $213_1$ Category name="Tests" —— $216_3$ $208_6$ { Field name="Test Result" —— $210_6$
Access Method="Simple" —— $212_6$
Table="patient" Column="testval"
Correlation="Age" —— $218_1$
FieldRef="AgeAtTest"
Correlation="Time" —— $218_2$
FieldRef="Test Date"

$208_7$ { Field name="Test Date" —— $210_7$
Access Method="Simple" —— $212_7$
Table="patient" Column="tesdate"

$208_8$ { Field name="AgeAtTest" —— $210_8$
Access Method="Composed" —— $212_8$
Composition=Field(Test Date)-Field(Birth Date) —— $213_2$

FIG. 2C

GLOBAL QUERY CORRELATION ATTRIBUTES

BACKGROUND OF THE INVENTION

1. Field of the Invention

The present invention generally relates to data processing and more particularly to accessing data using correlation criterion or criteria.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

When constructing complex queries against information stored in a database or data warehouse, it is often desirable to correlate the data entities being queried based on a common attribute. For example, data entities may be correlated based on all entities or events that: (i) occurred at a given point in time or within a given time span; (ii) occurred at the same time or within a given time interval of each other; (iii) occurred at the same location which may be scoped a number of different ways (e.g., same Street address, city, county, state, postal code, or country); (iv) occurred when an individual or item in question was a given age or within a given age range; and (v) occurred when the age associated with all data entities in question was the same.

The typical approach to constructing such complex queries involves augmenting the query with additional predicates to factor in the logic for the common correlation attribute(s) for each data entity being queried. Unfortunately, this approach requires a deeper understanding of the physical relationship of the data involved and of the particular data entities being queried (e.g., whether the data entity supports the concept of time, age or location). By way of example, consider a user interested in identifying males currently 60 years of age or older who were found to have a liver enzyme level above a certain threshold and who underwent surgery to correct the liver abnormality. In SQL, a corresponding query may take the form of Query 1.

| SQL QUERY 1 |
| --- |
| SELECT ASTValue, Diagnostics, SurgeryType<br>    FROM Demographics, TestResults, SurgeryRecord<br>    WHERE Gender ="M" AND YEAR (CURRENT_DATE −<br>    BirthDate) >= 60 AND<br>    ASTValue > 30 AND SurgeryType = "Liver" |

Now assume the user desires to narrow the data returned to only include those cases where the person was tested and had the surgery within thirty days. This could be accomplished by extending the SQL Query 1 with additional predicates to select test and surgery events that occurred within the same time span, as illustrated by Query 2.

| SQL QUERY 2 |
| --- |
| SELECT ASTValue, Diagnostics, SurgeryType<br>    FROM Demographics, TestResults, SurgeryRecord<br>    WHERE Gender ="M" AND YEAR (CURRENT_DATE −<br>    BirthDate) >= 60 AND<br>    ASTValue > 30 AND SurgeryType = "Liver" AND<br>    DAYS (SurgeryDate − TestDate) <= 30 |

In another case, the user may desire to identify individuals with the same combination of criteria, but limiting the results to those people who were between the ages of 40 and 50 when they had the test and surgery. This would require a different set of predicates being added to the base query, as illustrated by Query 3.

| SQL QUERY 3 |
| --- |
| SELECT ASTValue, Diagnostics, SurgeryType<br>    FROM Demographics, TestResults, SurgeryRecord<br>    WHERE Gender ="M" AND YEAR (CURRENT_DATE −<br>    BirthDate) >= 60 AND<br>ASTValue > 30 AND SurgeryType = "Liver" AND<br>    YEAR (SurgeryDate − BirthDate) >= 40 AND YEAR<br>    (SurgeryDate − BirthDate) <=<br>50 AND YEAR (TestDate − BirthDate) > = 40 AND YEAR (TestDate − BirthDate) <= 50 |

The foregoing examples illustrate that, while the base query remains the same in each case, additional predicates are added to accomplish the desired correlation between entities examined by the query. As a result, the burden on the end-user to access the desired data is substantial.

Therefore, there is a need for a manner of implementing correlation logic within queries.

SUMMARY OF THE INVENTION

The present invention generally is directed to a method, system and article of manufacture for accessing data using a correlation criterion or criteria.

One embodiment provides a method of providing attributes configured to add query logic to a query generated from an abstract query defined by one or more logical field. The method comprises specifying which of a plurality of correlation attributes are supported for a particular logical field; and specifying a definition for computing a value of the correlation attributes supported for the particular logical field.

Another embodiment provides a method of providing attributes configured to add query logic to a query generated from an abstract query defined by one or more logical field. The method comprises for each of a plurality of logical fields, specifying which of a plurality of correlation attributes are supported for a particular logical field; and for each of a plurality of logical fields, specifying a definition for computing a value of the correlation attributes supported for the particular logical field; wherein at least two of the definitions for computing a value of a particular correlation attribute, specified for two different logical fields, are different.

Another embodiment provides a method of adding query logic to a query generated from an abstract query defined by one or more logical field, the method comprising, for each condition of the abstract query: building an executable query contribution; determining whether the abstract query includes at least one of a plurality of correlation criterions which applies to a logical field of the condition, wherein each of the plurality of correlation criterion have a corresponding correlation attribute definition for calculating a value, and wherein at least two different corresponding correlation attribute definitions are defined for a given correlation criterion.

Yet another embodiment provides a computer readable medium containing a program which, when executed, performs an operation of adding query logic to a query generated from an abstract query defined by one or more logical field. The operation comprises, for each condition of the abstract query: building an executable query contribution; determining whether the abstract query includes at least one of a plurality of correlation criterions which applies to a logical field of the condition, wherein each of the plurality of correlation criterion have a corresponding correlation attribute definition for calculating a value, and wherein at least two different corresponding correlation attribute definitions are defined for a given correlation criterion.

Yet another embodiment provides a computer-readable medium, comprising information stored thereon, the information comprising: a query specification comprising a plurality of logical fields for defining abstract queries; at least one correlation attribute definition specified for at least one of the plurality of logical fields, wherein the correlation attribute definition comprises a name and a definition for calculating a value of the correlation attribute correlation attribute definition; and a runtime component executable to perform an operation in response to receiving an abstract query issued against the data, wherein the abstract query is defined according to the query specification and is configured with the at least one logical field for which the at least one correlation attribute definition is specified. The operation comprises calculating the correlation attribute value for the at least one logical field.

Still another embodiment provides a computer-readable medium, comprising information stored thereon, the information comprising: a query specification comprising a plurality of logical fields for defining abstract queries; a plurality of correlation attribute definitions specified for at least two of the plurality of logical fields, wherein each correlation attribute definition comprises a name and a definition for calculating a value of the correlation attribute correlation attribute definition; and a runtime component executable to perform an operation in response to receiving an abstract query issued against the data, wherein the abstract query is defined according to the query specification and is configured with the at least one logical field for which the at least one correlation attribute definition is specified. The operation comprises calculating the correlation attribute value for the at least one logical field.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
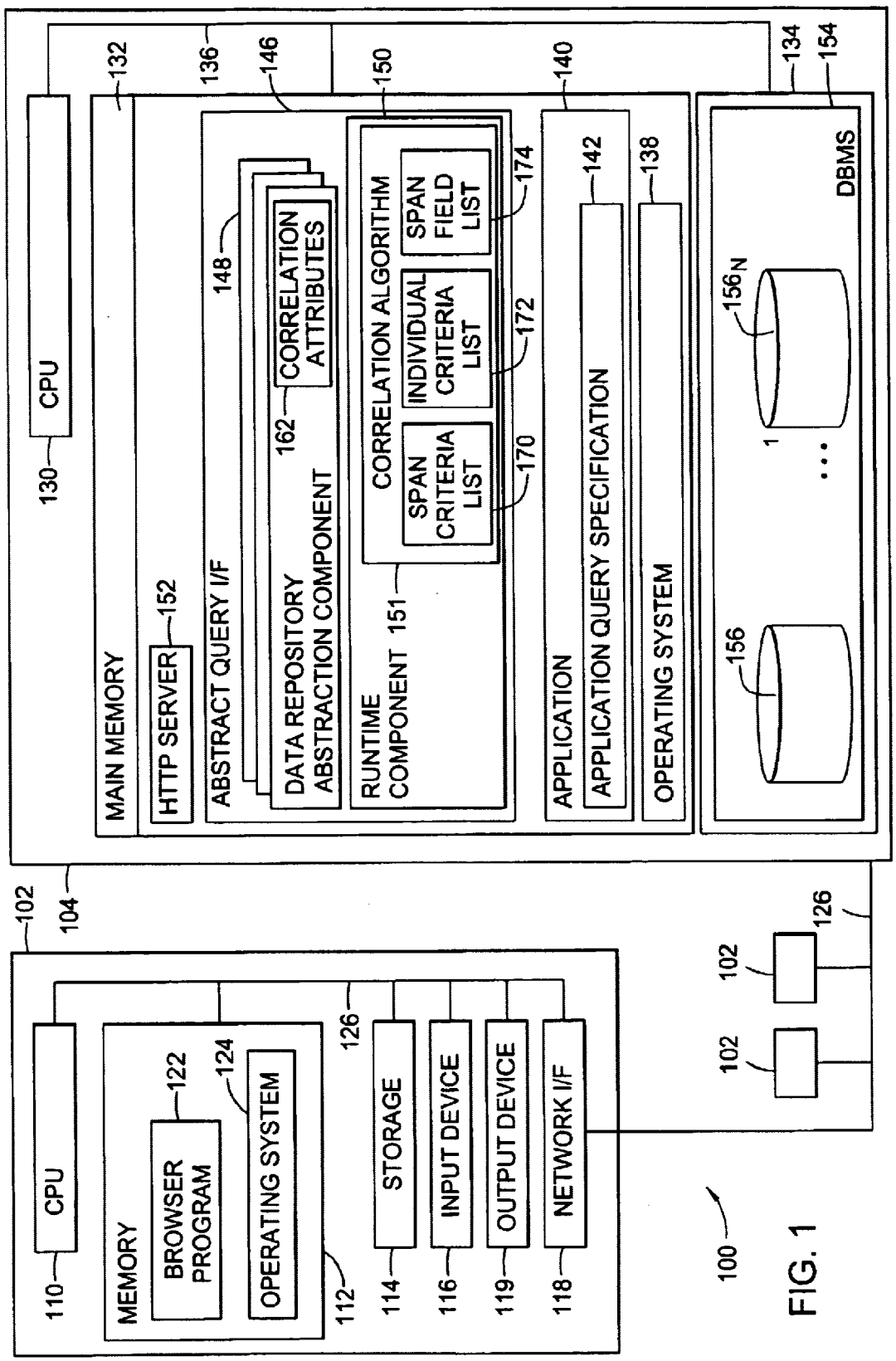
FIG. 1 is one embodiment of a computer system.

The present invention generally is directed to a system, method and article of manufacture for accessing data. In general, data access is facilitated by a query configured with a correlation criterion or criteria. The presence of the correlation criteria facilitates the introduction of additional correlation logic to be applied to conditions of the query. In general, correlation criteria are contemplated which support correlation of entities based on time, physical location and age.

In one embodiment, correlation attributes are implemented as part of a logical model of data. The logical model is referred to herein as a data repository abstraction layer, which provides a logical view of the underlying data repository. In this way, data is made independent of the particular manner in which the data is physically represented. A query abstraction layer is also provided and is based on the data repository abstraction layer. A runtime component performs translation of an abstract query into a form that can be used against a particular physical data representation.

For convenience, the term "correlation" is used herein to refer to a query criterion and an attribute defined as part of a data repository abstraction layer. The term "correlation" conveys one aspect of the invention in which query logic may be applied to two or more query conditions with respect to a common entity. However, in another aspect, query logic may also be applied to only one query condition. As will be evident from the following disclosure, an advantage is still realized by the end-user, in that the end-user is not burdened with determining how the entity is to be calculated. As such, "correlation" occurs between a query condition and, for example, a particular time, location or age attribute (versus simply correlation between two or more query conditions). Significantly, a correlation attribute applies to the query as a whole and will influence the data selection logic associated with all condition fields that support the particular type of correlation attribute.

One embodiment of the invention is implemented as a program product for use with a computer system such as, for example, the computer system shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Environment

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface component 118 may be any entry/exit component configured to allow network communications between the client computer 102 and the server computer 104 via the network 126. For example, the network interface component 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any program (preferably GUI-based) capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database (e.g., databases $156_1 \ldots 156_N$, collectively referred to as database(s) 156). Illustratively, the databases 156 are shown as part of a database management system (DBMS) in storage 134. The databases 156 are representative of any collection of data regardless of the particular physical representation. By way of illustration, the databases 156 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed/executed using logical fields defined by the abstract query interface 146. In particular, the logical fields used in the abstract queries are defined by a data repository abstraction component 148 of the abstract query interface 146. The abstract queries are executed by a runtime component 150 which first transforms the abstract queries into a form consistent with the physical representation of the data contained in the DBMS 154.

In one embodiment, the data repository abstraction component 148 is configured with correlation attributes 162. The correlation attributes 162 may, for example, specify space and time constraints that may be placed on a logical field to be used for defining relationships between conditions of a query. A correlation algorithm 151 of the runtime component 150 operates to enforce the rules specified by the correlation attributes 162. To this end, the runtime component 150 may maintain temporary data structures which include a span criteria list 170, an individual criteria list 172, and a span field list 174.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 152 (e.g., a web server) adapted to service requests from the client computer 102. For example, the server process 152 may respond to requests to access the database(s) 156, which illustratively resides on the server 104. Incoming client requests for data from a database 156 invoke an application 140. When executed by the processor 130, the application 140 causes the server computer 104 to perform the steps or elements embodying the various aspects of the invention, including accessing the database(s) 156. In one embodiment, the application 140 comprises a plurality of servlets configured to build GUI elements, which are then rendered by the browser program 122.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable to future changes in a particular markup language as well as to other languages presently unknown. Likewise, the HTTP server process 152 shown in FIG. 1 is merely illustrative and other embodiments adapted to support any known and unknown protocols are contemplated.

Logical/Runtime View of Environment

Figure 2A:
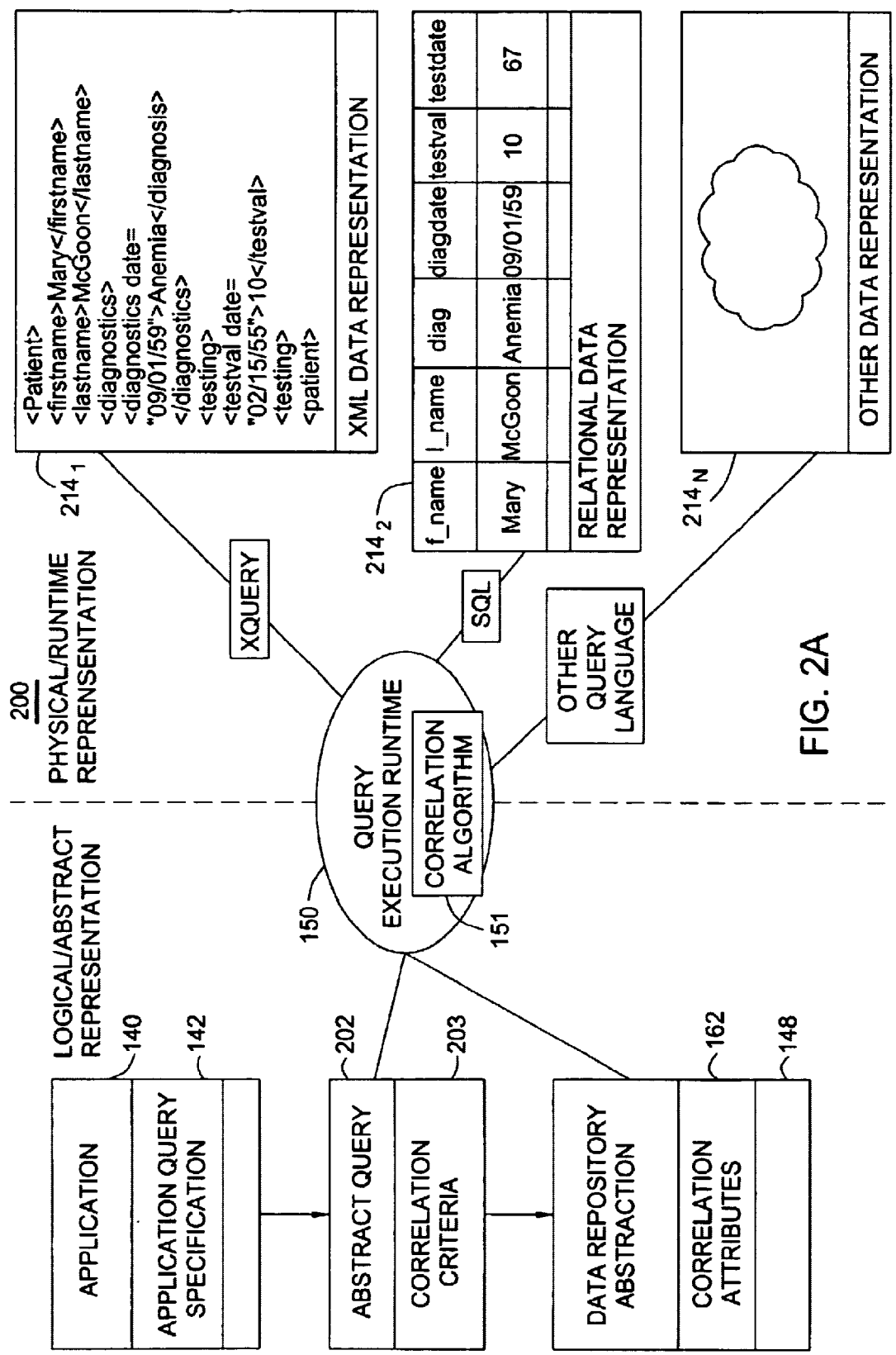
FIG. 2A is a logical/physical view of software components of one embodiment of the invention.
Figure 2B:
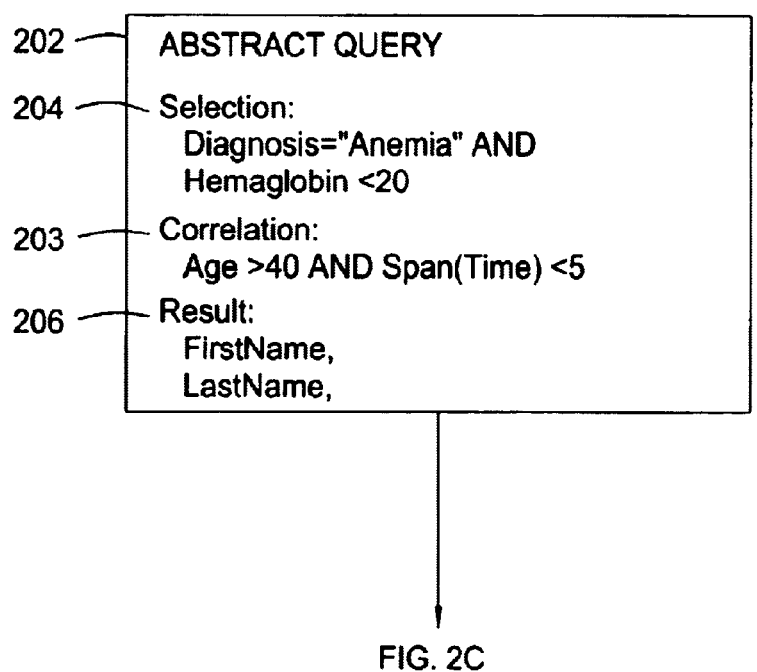
FIG. 2B is a logical view of an abstract query and a data repository abstraction.

FIGS. 2A–B show an illustrative relational view 200 of components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 142 may include criteria used for data selection (selection criteria 204), criteria used for correlating one or more (and more typically, two or more) conditions of a query (correlation criteria 203) and an explicit specification of the fields to be returned (return data specification 206) based on the selection criteria 204.

The details of the abstract query 202 shown in FIG. 2B are shown in Table I below. By way of illustration, the abstract query 202 is defined using XML. However, any other language may be used to advantage.

TABLE I

ABSTRACT QUERY EXAMPLE

| | |
|---|---|
| 001 | <QueryAbstraction> |
| 002 |   <Selection> |
| 003 |     <Condition field="Diagnosis" operator="EQ" value="Anemia"/> |
| 004 |     <Condition field="Hemoglobin" operator="LT" value="20" |
| 005 |       relOperator="AND"/> |
| 006 |     <Correlation attribute="Age" operator="GT" value="40"/> |
| 007 |     <Correlation attribute="Span(Time)" operator="LT" value="5" |
| 008 |       relOperator="AND"/> |
| 009 |   </Selection> |
| 010 |   <Results> |
| 011 |     <Field name="FirstName"/> |
| 012 |     <Field name="LastName"/> |
| 013 |   </Results> |
| 014 | </QueryAbstraction> |

Illustratively, the abstract query shown in Table I includes a selection specification (lines 001–009) containing selection criteria and a results specification (lines 010–014). In one embodiment, a selection criterion (also referred to herein as a "condition") consists of a field name (for a logical field), a comparison operator (=,>, <, etc) and a value expression (what is the field being compared to). In one embodiment, the result specification is a list of abstract fields that are to be returned as a result of query execution. A result specification in the abstract query may consist of a field name and sort criteria. Illustratively, the correlation criteria are an Age correlation criterion and a Span(Time) correlation criterion. The correlation criteria are each applied to one or more conditions of the query. In this example, the Age correlation criterion adds additional logic to the individual predicates used to select particular diagnosis and test result values. The Span(Time) criterion adds additional logic to the query as a whole, in this case, selecting only those patients whose diagnosis and test results were within 5 days of each other.

By way of comparison, the following represents the SQL query corresponding abstract query of Table I.

---
SQL QUERY 4
---
SELECT f_name, l_name FROM patient WHERE
    (diag = 'Anemia' AND YEAR(diagdate-birthdate) > 40) AND
    (testval < 20 AND YEAR(testdate-birthdate) > 40) AND
    (ABS(DAYS(diagdate − testdate)) < 5)
---

Note that the user is burdened with applying correlation logic to each condition as desired. In contrast, in the present invention, the correlation criteria are applied to each condition for which a predefined correlation attribute exists in the data repository abstraction component 148. Aspects of the data repository abstraction component 148 in this regard will be described in more detail below.

In one embodiment, the correlation criteria 203, selection criteria 204, and return data specification 206 may each be specified by a user via a user interface, e.g., the browser program 122. To this end, the user interface may include separate input fields for each of the correlation criteria 203, selection criteria 204, and return data specification 206, whereby an abstract query 202 is composed.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 (which may be in response to user input query conditions) to specify criteria for data selection, criteria for correlation of query conditions and specify the form of result data returned from a query operation. The logical fields are defined independently of the underlying data representation being used in the DBMS 154, thereby allowing queries to be formed that are loosely coupled to the underlying data representation.

In general, the data repository abstraction component 148 comprises a plurality of field specifications $208_1$, $208_2$, (six shown by way of example), collectively referred to as the field specifications 208. Specifically, a field specification is provided for each logical field available for composition of an abstract query. In one embodiment, a field specification 208 comprises a logical field name $210_1$, $210_2$ . . . (collectively, field names 210) and an associated access method $212_1$, $212_2$ . . . (collectively, access methods 212). In the illustrative embodiment field specifications 208 also include one or more category names $216_1$, $216_2$ and $216_3$ (collectively, category names 216). The category names associate a group of logical field names. For example, in FIG. 2B the field specifications $208_1$, and $208_2$ are part of a Demographic category $216_1$, the field specification $208_3$, $208_4$, and $208_5$ are part of a Diagnostics category $216_2$ and the field specification $208_6$, $208_7$, and $208_8$ are part of a Tests category $216_2$. However, the use of categories is merely representative of a particular embodiment, and other embodiments do not utilize categories.

The access methods 212 associate (i.e., map) the logical field names to a particular physical data representation $214_1$, $214_2$ . . . $214_N$ in a database (e.g., one of the databases 156). By way of illustration, two data representations are shown in FIG. 2A, an XML data representation $214_1$, and a relational data representation $214_2$. However, the physical data representation $214_N$ indicates that any other data representation, known or unknown, is contemplated.

In one embodiment, a single data repository abstraction component 148 contains field specifications (with associated access methods) for two or more physical data representations 214. In an alternative embodiment, a different single data repository abstraction component 148 is provided for each separate physical data representation 214. In yet another embodiment, multiple data repository abstraction components 148 are provided, where each data repository abstraction component 148 exposes different portions of the same underlying physical data (which may comprise one or more physical data representations 214). In this manner, a single application 140 may be used simultaneously by multiple users to access the same underlying data where the particular portions of the underlying data exposed to the application are determined by the respective data repository abstraction component 148.

Any number of access methods are contemplated depending upon the number of different types of logical fields to be supported. In one embodiment, access methods for simple fields, filtered fields and composed fields are provided. The field specifications $208_1$ and $208_2$ exemplify simple field access methods $212_1$ and $212_2$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "patient". Filtered fields (no example shown in FIG. 2) identify an associated physical entity and provide rules used to define a particular subset of items within the physical data representation. An example of a filtered field is a New York ZIP code field that maps to the physical representation of ZIP codes and restricts the data only to those ZIP codes defined for the state of New York. Composed access methods (e.g., $213_1$ and $213_2$,) compute a logical field from one or more physical fields using an expression supplied as part of the access method definition. In this way, information which does not exist in the underlying data representation may computed. An example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 148 shown in FIG. 2 are representative of logical fields mapped to data represented in the relational data representation $214_2$. However, other instances of the data repository abstraction component 148 map logical fields to other physical data representations, such as XML.

One or more of the field specifications 208 may also be configured with a correlation attribute (collectively depicted in FIG. 1 as correlation attributes 162). For example, the Diagnosis field specification $208_3$ includes an Age correlation attribute $218_1$ and a Time correlation attribute $218_2$, and the Test Result field specification $208_6$ also includes the Age correlation attribute $218_2$, and the Time correlation attribute $218_2$. It should be noted that not every field specification need have a correlation attribute.

Generally, the correlation attributes identify entities/ events which a logical field may be correlated with respect to. In one embodiment, logical fields may be correlated with respect to time (a particular point in time or span of time), physical location and age. Thus, in one embodiment, the correlation attributes identify the dimensions of space or time that may be used to constrain instances of data associated with the logical field. However, more generally, correlation attributes could be defined that consider other properties of various entities involved in query operations such as: color, weight, volume, length, width, etc. As can be seen from FIG. 2B, the correlation attributes associated with each field definition generally comprise a "Name" and a "Fieldref". The Name provides a handle for identifying the correlation attribute according to what the corresponding field (for which the correlation attribute is defined) can be correlated on. For example, the correlation attribute 218, is given the name "Age" signifying that the corresponding logical field can be correlated with respect to age. In the present example, the Age correlation attribute $218_1$, and the Time correlation attribute $218_2$ are part of the field specifications for the "Diagnosis" logical field $210_3$ and the "Test Result" logical field $210_6$. The "Fieldref" provides the definition of the correlation attribute for a particular logical field. For example, the "Fieldref" for the Age correlation attribute 218, of the "Diagnosis" logical field $210_3$ specifies a definition referred to as "AgeAtDiagnosis". In the present embodiment, "AgeAtDiagnosis" is another logical field $210_5$, which is also part of the Diagnostics category $216_2$. More specifically, the "AgeAtDiagnosis" logical field $210_5$ is a composed field, as defined above. In the present example, the composed logical field $210_5$ receives as input parameters the Diagnosis Date and Birth Date and takes the difference between the parameter values. In this manner, the Age correlation attribute may take on any variety of definitions. For example, the Age correlation attribute $218_1$ specified for the logical field Test Result $210_6$ is defined according to the age at the test (Fieldref="AgeAtTest"). The "AgeAtTest" logical field $210_8$ is a composed field receiving as input the Test Date and Birth Date and taking the difference, whereby the age at the time of test is calculated.

In operation, when an abstract query configured with correlation criteria (such as the one illustrated in Table I and by the abstract query 202 of FIG. 2B) is issued for execution, the correlation algorithm 151 takes steps to determine whether each condition to which the correlation criteria are applied supports the correlation criteria. This is done using information in the corresponding data repository abstraction component 148 which defines the necessary metadata and access method information for logical fields that are referenced by the abstract query 202. Specifically, the correlation attributes 162 of the data repository abstraction component 148 are examined to see which correlation criteria are supported for the specified logical fields of the abstract query. For each logical field which supports the correlation criteria, additional predicates are added to an executable query statement generated to represent the abstract query.

An illustrative data repository abstraction component 148 corresponding to that shown in FIG. 2B may be further illustrated with reference to Table II. By way of illustration, the Data Repository Abstraction component is defined using XML. However, any other language may be used to advantage.

TABLE II

DATA REPOSITORY ABSTRACTION EXAMPLE

```
001  <DataRepository>
002    <Category name="Demographic">
003      <Field queryable="Yes" displayable="Yes" name=
           "FirstName">
004        <AccessMethod>
005          <Simple columnName="f_name" tableName=
             "patient" />
006        </AccessMethod>
007        <Type baseType="char"/>
008      </Field>
009      <Field queryable="Yes" displayable="Yes" name=
           "LastName">
010        <AccessMethod>
011          <Simple columnName="l_name" tableName=
             "patient" />
012        </AccessMethod>
013        <Type baseType="char"/>
014      </Field>
015      <Field queryable="Yes" displayable="Yes" name=
           "Birth Date">
016        <AccessMethod>
017          <Simple columnName="b_date" tableName=
             "patient" />
018        </AccessMethod>
019        <Type baseType="date"/>
020      </Field>
021    </Category>
022    <Category name="Diagnostics">
023      <Field queryable="Yes" displayable="Yes" name=
           "Diagnosis">
024        <AccessMethod>
025          <Simple columnName="diag" tableName="patient" />
026        </AccessMethod>
027        <Correlation name="Age" fieldRef="AgeAtDiagnosis"/>
028        <Correlation name="Time" fieldRef="DiagnosisDate"/>
029        <Type baseType="char"/>
030      </Field>
031      <Field queryable="Yes" displayable="Yes" name=
           "DiagnosisDate">
032        <AccessMethod>
033          <Simple columnName="diagdate" tableName=
             "patient" />
034        </AccessMethod>
035        <Type baseType="date"/>
036      </Field>
037      <Field queryable="Yes" displayable="Yes" name=
           "AgeAtDiagnosis">
038        <AccessMethod>
039          <Composed>
040            <Composition>YEAR(Field(DiagnosisDate) −
               Field(BirthDate))
041            </Composition>
042          </Composed>
043        </AccessMethod>
044        <Type baseType="int"/>
045      </Field>
046    </Category>
047    <Category name="Tests">
048      <Field queryable="Yes" displayable="Yes" name=
           "Hemoglobin">
049        <AccessMethod>
050          <Simple columnName="testval" tableName="patient" />
051        </AccessMethod>
052        <Correlation name="Age" fieldRef="AgeAtTest"/>
053        <Correlation name="Time" fieldRef="TestDate"/>
054        <Type baseType="int"/>
055      </Field>
056      <Field queryable="Yes" displayable="Yes" name=
           "TestDate">
057        <AccessMethod>
058          <Simple columnName="testdate" tableName=
             "patient" />
059        </AccessMethod>
060        <Type baseType="date"/>
061      </Field>
062      <Field queryable="Yes" displayable="Yes" name=
           "AgeAtTest">
```

TABLE II-continued

DATA REPOSITORY ABSTRACTION EXAMPLE

```
063          <AccessMethod>
064            <Composed>
065              <Composition>YEAR(Field(TestDate) −
                 Field(BirthDate))
066              </Composition>
067            </Composed>
068          </AccessMethod>
069          <Type baseType="int"/>
071        </Field>
072      </Category>
073  </DataRepository>
```

Figure 3A:
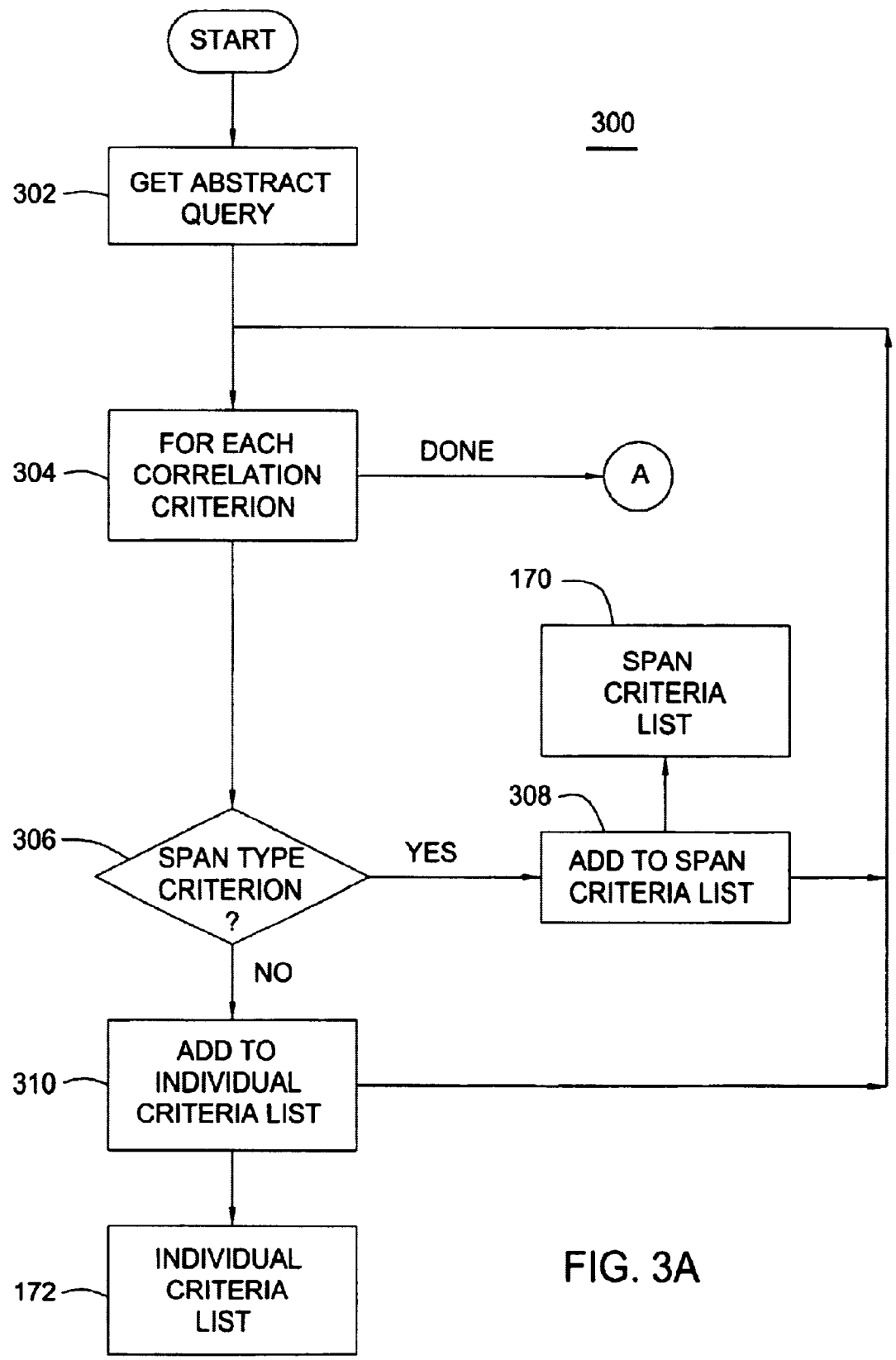
FIGS. 3A–C are a flowchart illustrating the operation of a runtime component.
Figure 3B:
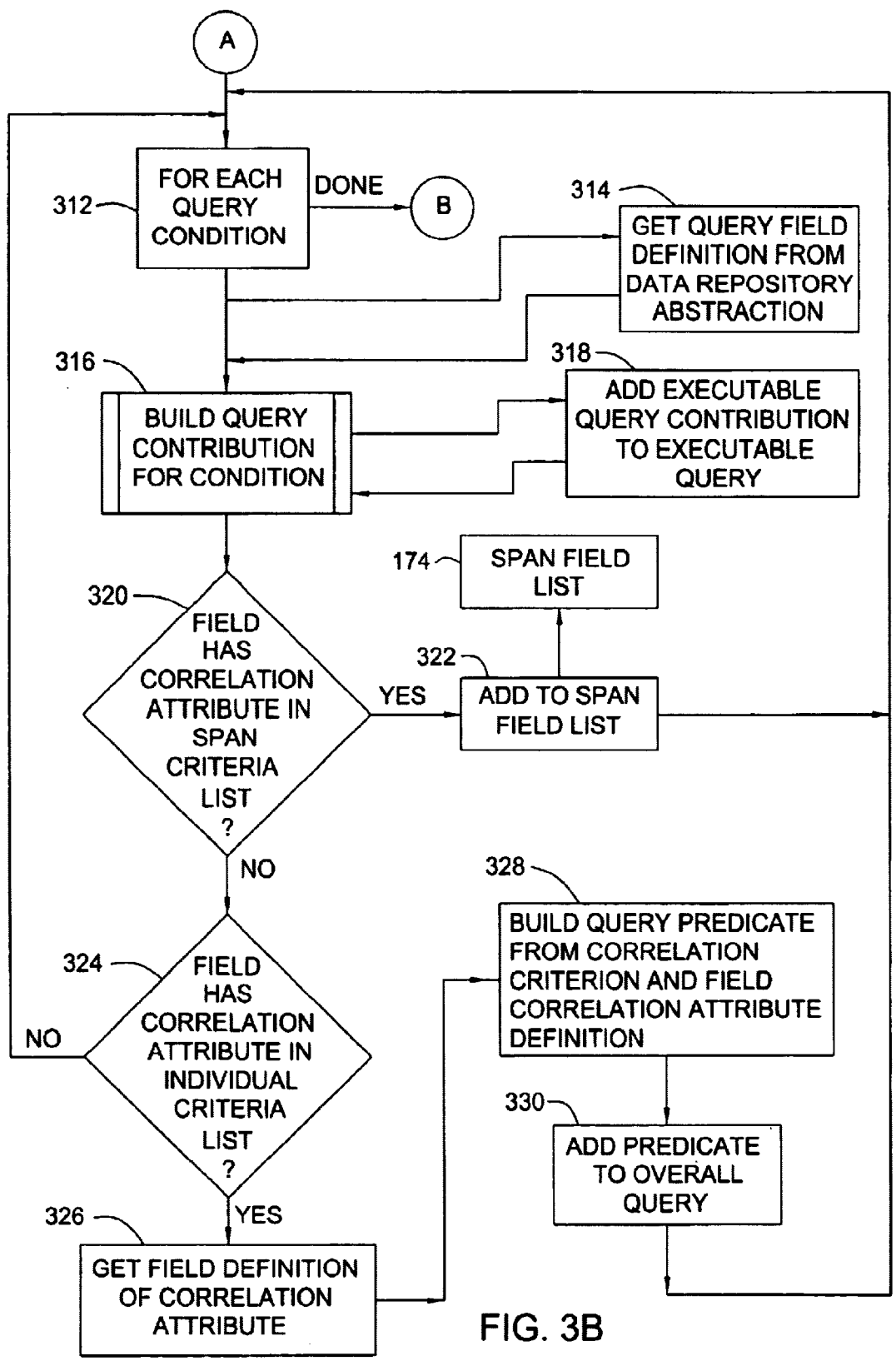
Figure 3C:
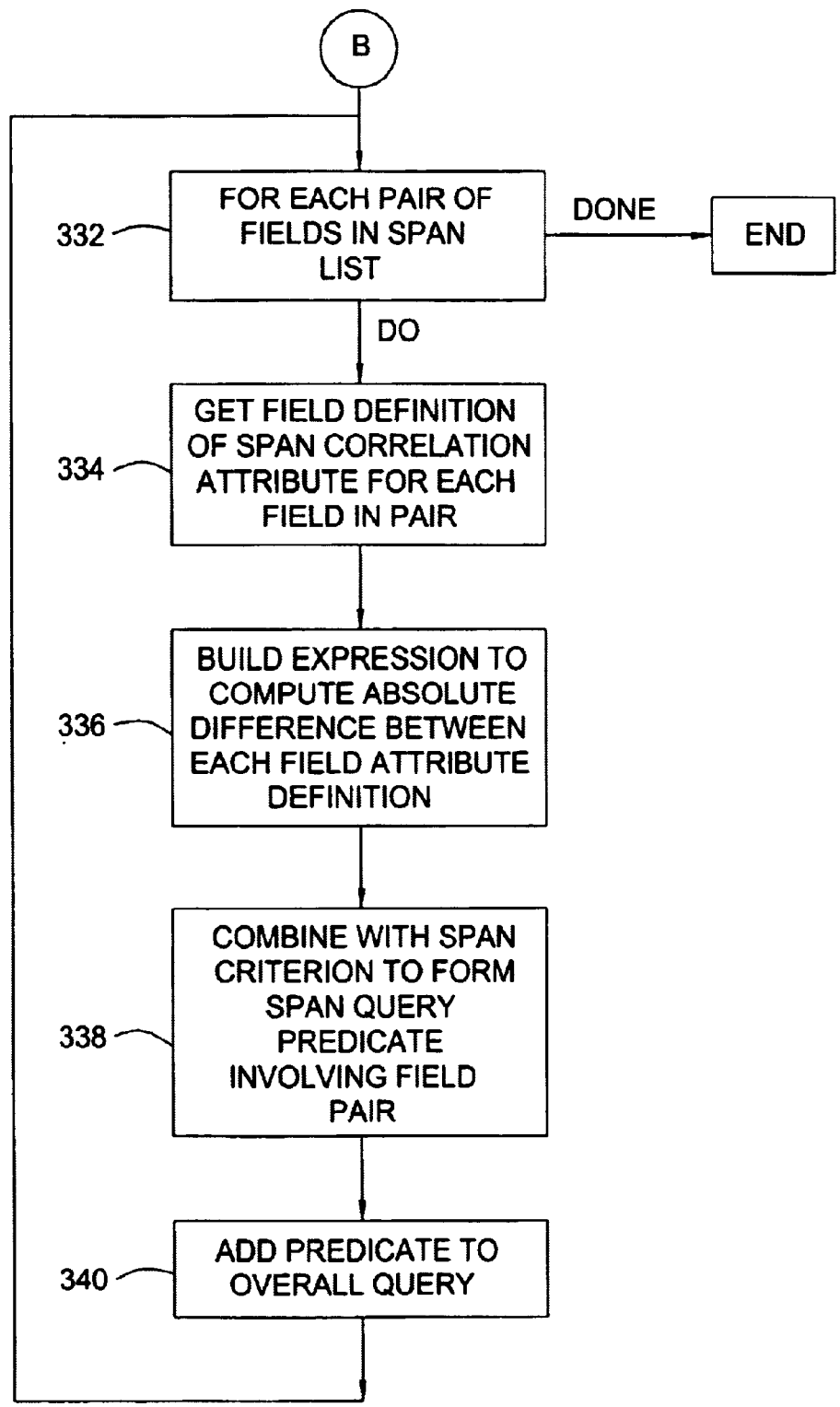

One embodiment for processing abstract queries by the run-time component 150 will now be described with reference to FIG. 3. The query processing method 300 is entered at step 302 where an abstract query is received by the run-time component 150 for processing. Further, the runtime component 150 reads and parses the instance of the abstract query and locates individual selection criteria, correlation criteria and desired result fields. Add step 304, a loop is entered and performed for each correlation criterion in the abstract query. Add step 306, the run-time component 150 determines whether the criterion is a span type criterion, i.e., a criterion which correlates data entities based on the interval of time between each data entity. For example, the abstract query shown in FIG. 2B includes the correlation criterion "Span (Time)<5" which specifies that the abstract query data entities, for which the time correlation attribute applies, must be within five units of time (illustratively, days) of one another. If (at step 306) the criterion is a span type criterion, the criterion is added to a span criteria list 170 (see also FIG. 1) at step 308. The method 300 then returns to step 304 to begin processing for the next correlation criterion. If (at step 306), the criterion is not a span type criterion, the criterion is added to an individual criteria list 172 (see also FIG. 1) at step 310. The method 300 then returns to step 304 to begin processing for the next correlation criterion.

Once each of the correlation criterions in the abstract query have been processed, the method 300 continues to step 312 where a loop is entered for each condition having a selection criterion. Recall that, in one embodiment, a condition may consist of a field name (for a logical field), a comparison operator (=, >, <, etc) and a value expression (what is the field being compared to). At step 314, the runtime component 150 uses the field name from a condition of the abstract query to look up the definition of the field in the data repository abstraction 148. The runtime component 150 then builds (step 316) an Executable Query Contribution for the logical field being processed. As defined herein, an Executable Query Contribution is a portion of an executable query that is used to perform data selection based on the current logical field. An executable query is a query represented in languages like SQL and XML Query and is consistent with the data of a given physical data repository (e.g., a relational database or XML repository). Accordingly, the executable query is used to locate and retrieve data from the physical data repository, represented by the database 156 shown in FIG. 1. The Executable Query Contribution generated for the current field is then added to an Executable Query Statement, at step 318.

At step 320, the run-time component 150 determines whether the field of the condition being processed has a correlation attribute (i.e., in the data repository abstraction component 148) corresponding to a correlation criterion in the span criteria list 170. If so, the field is added to a span field list 174 at step 322. In one embodiment, a span field list 174 is provided for each type of span correlation attribute (i.e., one list for Span(Time), another for Span(Location), etc). However, in another embodiment, a single span field list is created at this step, a subset of fields is selected from this list when processing the individual span correlation criteria (processing is described below). The method 300 then returns to step 312 to begin processing the next selection criterion condition. However, if step 320 is answered negatively, processing continues to step 324 where the run-time component 150 determines whether the field being processed has a correlation attribute (i.e., in the data repository abstraction component 148) corresponding to a correlation criterion in the individual criteria list 172. If not, processing returns to step 312. Otherwise, the field definition of the correlation attribute for the field being processed is retrieved from the data repository abstraction component 148 at step 326. At step 328, the run-time component 150 builds a query predicate from the correlation criterion and the field correlation attribute definition. The predicate is added to the executable query at step 330. Processing then returns to step 312.

When each of the selection criterion conditions have been processed by the loop entered at step 312, the method 300 continues to step 332 where a loop is entered for each pair of fields (i.e., non-order-dependent permutation of fields for which the same correlation attribute is defined) in the span field list 174. At step 334, the run-time component 150 retrieves the field definition (i.e., from the data repository distraction component 148) of the correlation attribute for each field in the pair. At step 336, the run-time component 150 builds an expression to compute the absolute difference between each field attribute definition (e.g., ABS(DAYS (testdate−diagdate))). This expression is combined with the span criterion to form a span query predicate involving the field pair (e.g., ABS(DAYS(testdate−diagdate))>5). The predicate is then added to the executable query at step 340, and processing returns to step 332 for the next pair of fields in the span field list 174. Once each pair of fields has been processed, the method 300 ends and the query is ready for execution.

Figure 4:
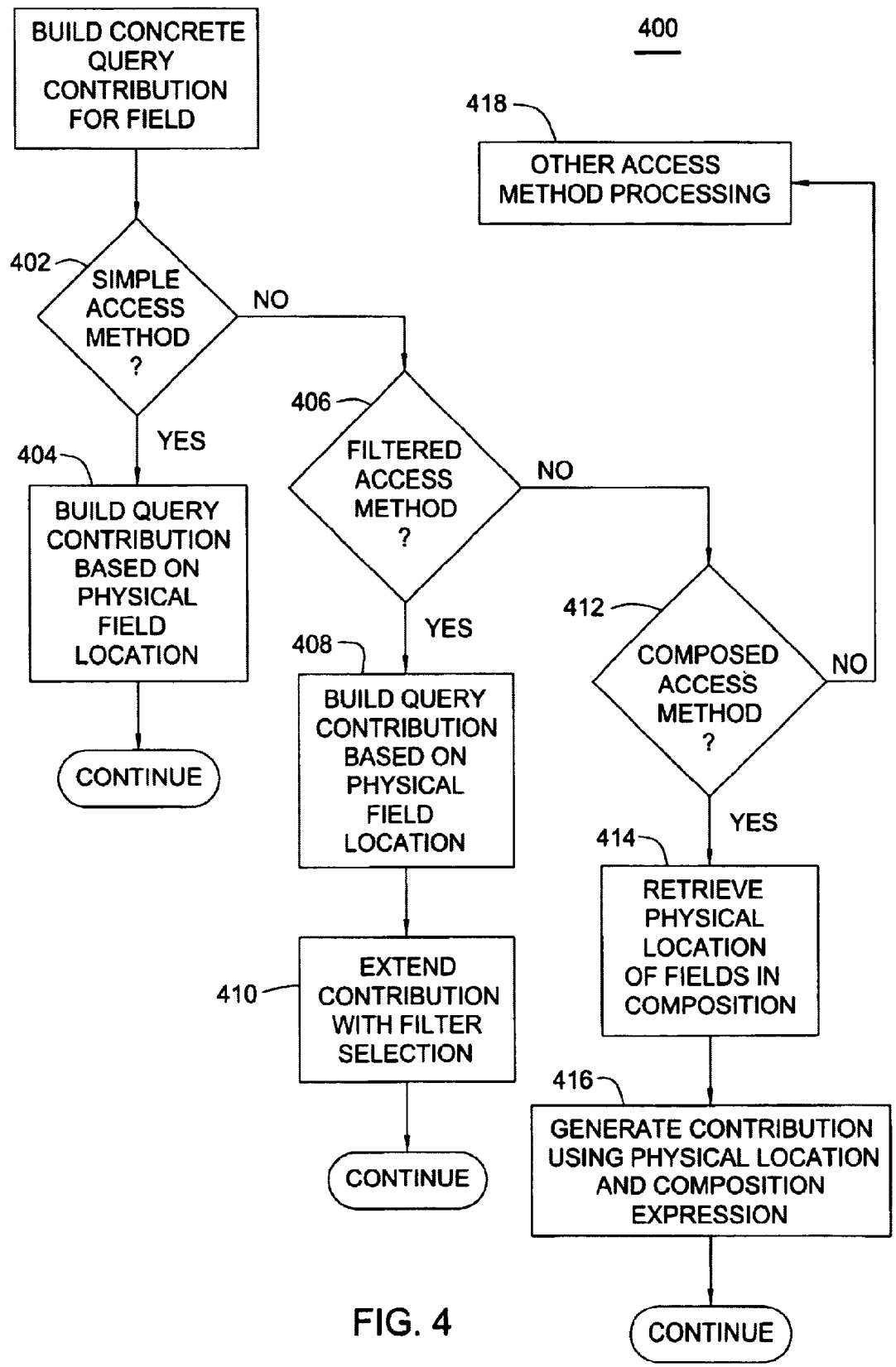
FIG. 4 is a flowchart illustrating the operation of the runtime component.

One embodiment of a method 400 for building an Executable Query Contribution for a logical field according to step 316 and step 328 is described with reference to FIG. 4. At step 402, the method 400 queries whether the access method associated with the current logical field is a simple access method. If so, the Executable Query Contribution is built (step 404) based on physical data location information and processing then continues according to method 300 described above. Otherwise, processing continues to step 406 to query whether the access method associated with the current logical field is a filtered access method. If so, the Executable Query Contribution is built (step 408) based on physical data location information for some physical data entity. At step 410, the Executable Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Executable Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As noted earlier, the logical field referenced in the query condition will define the correlation attribute and a "FieldRef" that identifies another logical field which defines how to interpret the given correlation attribute for the query condition field. The method 400 of FIG. 4 is executed using the "referenced" logical field and the logic associated with the correlation attribute. For example, if correlation criterion is Age>50 and a Test field includes a definition for Age with a FieldRef of AgeAtTest, then the method 400 builds a query predicate based on the condition AgeAtTest>50.

As described above, it may be necessary to perform a data conversion if a logical field specifies a data format different from the underlying physical data. In one embodiment, an initial conversion is performed for each respective access method when building a Executable Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Foregoing examples are directed to the medical field and the correlation attributes are illustrated with respect to time, location and age. However, invention is not so limited and extension to any database environment and type of data is contemplated. For example, as mentioned above, correlation attributes could be defined that consider other properties of various entities involved in query operations such as: color, weight, volume, length, width, etc. Consider the following abstract query (TABLE III) for which a corresponding data abstraction component may be defined.

TABLE III

ABSTRACT QUERY EXAMPLE

| | |
|---|---|
| 001 | <QueryAbstraction> |
| 002 |   <Selection> |
| 003 |     <Condition field="CarpetType" operator="EQ" value="berber"/> |
| 004 |     <Condition field="WallpaperPattern" operator="EQ" value="floral" |
| 005 | relOperator="AND" /> |
| 006 |     <Condition field="PaintFinish" operator="EQ" value="satin" relOperator="AND" |
| 007 | /> |
| 008 |     <Correlation attribute="Span(Color)" operator="LT" value="10"/> |
| 009 |   </Selection> |
| 010 |   <Results> |
| 011 |     <Field name="CarpetNumber"/> |
| 012 |     <Field name="WallpaperNumber"/> |
| 013 |     <Field name="PaintNumber"/> |

TABLE III-continued

ABSTRACT QUERY EXAMPLE

| | |
|---|---|
| 014 |   </Results> |
| 015 | </QueryAbstraction> |

This abstract query is designed to select a set of carpet, wallpaper and paint combinations based on criteria specified for type of carpet, pattern for the wallpaper and type of paint finish. Assuming each entity here (carpet, wallpaper, paint) defined a correlation attribute of "color", the correlation condition, Span(Color)<10, would restrict the combinations selected to those that are similar in color. A possible definition for Span(Color) would be RGB values for color that were within "n" units of each other in Red, Green and Blue content.

Accordingly, the data repository abstraction component 148 provides various advantages. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case where a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

Further, the use of global correlation attributes together with an abstract query and underlying data abstraction model, greatly simplifies the task of describing complex data query logic involving a high degree of data correlation and analysis. Furthermore, separation of the base data selection logic from the correlation logic makes it possible to quickly reuse the same base query, but with different correlation conditions.

With regard to the end user, the data repository abstraction eliminates much of the complexity associated with expressing correlated data queries. Specifically, the end-user no longer needs to worry about which query selection conditions support a given correlation approach, and is no longer burdened with having to understand how to express event-based and/or entity-based (e.g., time-based, location-oriented, etc.) logic for each new entity involved in a query.

While the use of a data repository abstraction model provides these and other advantages, it should be emphasized that persons skilled in the art will readily recognize that the purpose and function of the correlation attributes may be implemented separately from the data repository abstraction component 148. For example, embodiment provides additional metadata to supplement information on tables and columns used by an SQL-based query implementation. In this case, the metadata for a given column would identify a correlation attribute such as Age and an associated SQL query expression identifying how to compute age for the entity represented in the column. An SQL query preprocessor could then take an initial SQL query and one or more correlation conditions as input and would augment the SQL query with additional predicates to account for the provided correlation conditions. This would be done by scanning for references to the columns supporting the correlation attribute(s) from the set of correlation conditions and generating additional SQL WHERE clause predicates based on the query expression defined for a given column's definition of a particular correlation attribute.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

While the foregoing is directed to embodiments of the present invention, other and further embodiments of the invention may be devised without departing from the basic scope thereof, and the scope thereof is determined by the claims that follow.

What is claimed is:

1. A computer-implemented method of providing query attributes comprising:
    specifying which of a plurality of correlation attributes are supported for a particular logical field of one or more logical fields;
    for each particular field, specifying a correlation attribute definition for computing a value of the correlation attributes supported for the particular logical field, wherein the correlation attributes are configured to add query logic to a query generated from an abstract query defined by one or more logical fields;
    determining that a span correlation criterion applies to logical fields of two conditions of the abstract query; and
    building an expression to compute a difference between each value calculated by the correlation attribute definitions defined for the logical fields of the two conditions and corresponding to the span correlation criterion.

2. The method of claim 1, wherein specifying which of the plurality of correlation attributes are supported comprises specifying two or more correlation attributes for the particular logical field.

3. The method of claim 1, wherein the value is a time value.

4. The method of claim 1, wherein the value may be one of a color value, a weight value, a volume value, a length value and a width value.

5. A computer-implemented method of providing attributes configured to add query logic to a query generated from an abstract query defined by one or more logical fields, the method comprising:
    for each of a plurality of logical fields, specifying which of a plurality of correlation attributes are supported for a particular logical field;
    for each of a plurality of logical fields, specifying a correlation attribute definition for computing a value of the correlation attributes supported for the particular logical field; wherein at least two of the correlation attribute definitions for computing a value of a particular correlation attribute, specified for two different logical fields, are different;
    determining that a span correlation criterion applies to logical fields of two conditions of the abstract query; and
    building an expression to compute a difference between each value calculated by the correlation attribute definitions defined for the logical fields and corresponding to the span correlation criterion.

6. The method of claim 5, wherein specifying which of the plurality of correlation attributes are supported comprises specifying two or more correlation attributes for the particular logical field.

7. The method of claim 5, wherein the value is a time value.

8. A computer-implemented method of adding query logic to a query generated from an abstract query defined by one or more logical fields, the method comprising:
    for each condition of the abstract query:
        building an executable query contribution, wherein building the executable query contribution comprises building a query predicate according to an access method defined for a logical field of the condition and specifying a method of accessing physical data; and
        determining whether the abstract query includes at least one of a plurality of correlation criterions which applies to the logical field of the condition, wherein each of the plurality of correlation criterion have a corresponding correlation attribute definition for calculating a value, and wherein at least two different corresponding correlation attribute definitions are defined for a given correlation criterion.

9. The method of claim 8, further comprising, if the abstract query includes at least one of the plurality of correlation criterions which applies to the logical field of the condition, building a query predicate from the correlation criterion and the correlation attribute definition.

10. The method of claim 8, wherein the value may be one of an age value, a time value and a location value.

11. The method of claim 8, further comprising:
    determining that a span correlation criterion applies to logical fields of two conditions of the abstract query; and
    building an expression to compute a difference between each value calculated by the correlation attribute definitions defined for the logical fields and corresponding to the span correlation criterion.

12. A tangible computer readable medium containing a program which, when executed, performs an operation of adding query logic to a query generated from an abstract query defined by one or more logical fields, the operation comprising:

for each condition of the abstract query:
building an executable query contribution, wherein building the executable query contribution comorises building a query predicate according to an access method defined for a logical field of the condition and specifying a method of accessing physical data; and
determining whether the abstract query includes at least one of a plurality of correlation criterions which applies to the logical field of the condition, wherein each of the plurality of correlation criterion have a corresponding correlation attribute definition for calculating a value, and wherein at least two different corresponding correlation attribute definitions are defined for a given correlation criterion.

13. The computer readable medium of claim 12, further comprising, if the abstract query includes at least one of the plurality of correlation criterions which applies to the logical field of the condition, building a query predicate from the correlation criterion and the correlation attribute definition.

14. The computer readable medium of claim 12, wherein the value may be one of an age value, a time value and a location value.

15. The computer readable medium of claim 12, further comprising:
determining that a span correlation criterion applies to logical fields of two conditions of the abstract query; and
building an expression to compute a difference between each value calculated by the correlation attribute definitions defined for the logical fields and corresponding to the span correlation criterion.

16. A computer system, comprising:

a query specification comprising a plurality of logical fields for defining abstract queries;

at least one correlation attribute definition specified for at least two of the plurality of logical fields, wherein each resoective correlation attribute definition comprises a name and a definition for calculating a value of the correlation attribute correlation attribute definition; and a runtime component executable to perform an operation in response to receiving an abstract query issued against the data, wherein the abstract query is defined according to the query specification and is configured with the at least two logical fields for which the respective at least one correlation attribute definition is specified, the operation comprising:
determining that a span correlation criterion applies to logical fields of two conditions of the abstract query, the logical fields comprising the at least two logical fields;
building an exoression to compute a difference between each value calculated by the correlation attribute definitions defined for the logical fields and corresponding to the span correlation criterion; and
calculating the correlation attribute value for the at least two logical fields.

17. The system of claim 16, further comprising a plurality of mapping rules which map the plurality of logical fields to physical entities of data.

18. The system of claim 16, wherein the value is a time value.

19. A tangible computer-readable medium, comprising information stored thereon, the information comprising:

a query specification comprising a plurality of logical fields for defining abstract queries;

a plurality of correlation attribute definitions specified for at least two of the plurality of logical fields, wherein each correlation attribute definition comprises a name and a definition for calculating a value of the correlation attribute correlation attribute definition; and a runtime component executable to perform an operation in response to receiving an abstract query issued against the data, wherein the abstract query is defined according to the query specification and is configured with the at least two logical fields for which respective ones of the correlation attribute definitions are specified, the operation comprising:
determining that a span correlation criterion applies to logical fields of two conditions of the abstract query, the logical fields comprising the at least two logical fields;
building an expression to compute a difference between each value calculated by the correlation attribute definitions defined for the logical fields and corresponding to the span correlation criterion; and
calculating the correlation attribute value for the logical fields.

20. The computer-readable medium of claim 19, wherein the value is a time value.

21. The computer-readable medium of claim 19, further comprising a plurality of mapping rules which map the plurality of logical fields to physical entities of data.

22. A computer-implemented method of translating an abstract query into a query executable by a database management system, the method comprising:

receiving an abstract query, the abstract query comprising at least two conditions and at least one correlation criterion, the correlation criterion being a span criterion applying to logical fields of the two conditions, wherein the at least one correlation criterion is referenced in a definition of the logical field and has a corresponding correlation attribute definition for calculating a correlation attribute value to be applied to the respective logical field of the respective condition, wherein the definitions of the logical fields are defined in a data abstraction repository layer and each comprises an access method specifying a method of accessing physical data;

building an expression to compute a difference between each value calculated by the correlation attribute definitions defined for the logical fields and corresponding to the span correlation criterion;

translating the abstract query into a query executable by a database management system;

issuing the executable query against the database management system; and receiving the result from the database management system.

* * * * *